US012644447B2

(12) United States Patent
Gerbode et al.

(10) Patent No.: US 12,644,447 B2
(45) Date of Patent: Jun. 2, 2026

(54) PISTON FOR A COMPRESSOR, COMPRESSOR, AND METHOD AND REMOVAL TOOL FOR DISASSEMBLING A PISTON

(71) Applicant: BURCKHARDT COMPRESSION AG, Winterthur (CH)

(72) Inventors: Philipp Gerbode, Winterthur (CH); Patrick Gürtler, Winterthur (CH)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 18/837,626

(22) PCT Filed: Feb. 10, 2023

(86) PCT No.: PCT/EP2023/053264
§ 371 (c)(1),
(2) Date: Aug. 12, 2024

(87) PCT Pub. No.: WO2023/152265
PCT Pub. Date: Aug. 17, 2023

(65) Prior Publication Data
US 2025/0163901 A1 May 22, 2025

(30) Foreign Application Priority Data
Feb. 10, 2022 (EP) ..................................... 22156037

(51) Int. Cl.
*F04B 39/14* (2006.01)
*B25B 27/00* (2006.01)
(Continued)

(52) U.S. Cl.
CPC .......... *F04B 39/14* (2013.01); *B25B 27/0028* (2013.01); *F04B 39/0022* (2013.01);
(Continued)

(58) Field of Classification Search
CPC ... F04B 39/042; F16J 1/008; F16J 9/06; F16J 9/064; F16J 9/16; F16J 9/20
See application file for complete search history.

(56) References Cited

U.S. PATENT DOCUMENTS

| | | | |
|---|---|---|---|
| 2,295,521 | A | 9/1942 | Payne |
| 3,282,172 | A | 11/1966 | Parker |

(Continued)

FOREIGN PATENT DOCUMENTS

| | | |
|---|---|---|
| DE | 571579 C | 3/1933 |
| GB | 1176026 | 1/1970 |
| JP | 2003206860 A | 7/2003 |

OTHER PUBLICATIONS

National Search Report for EP 22 156 037.8, prepared by the European Patent Office, dated Jul. 13, 2022, 6 pages.

(Continued)

*Primary Examiner* — Michael Leslie
(74) *Attorney, Agent, or Firm* — Brooks Kushman P.C.

(57) ABSTRACT

A piston for a compressor comprises a piston rod which defines a longitudinal axis, and a piston ring package with a carrier sleeve which extends along the longitudinal axis, is arranged on a circumferential surface of the piston rod and is releasably fastened to the piston rod, and a plurality of piston ring devices arranged next to one another along the longitudinal axis, which are arranged on an outer circumferential surface of the carrier sleeve and are fastened to the carrier sleeve, the carrier sleeve preferably having a mechanical interface for attaching a withdrawal tool for applying a force directed along the longitudinal axis.

12 Claims, 4 Drawing Sheets

(51) Int. Cl.

| | |
|---|---|
| *F04B 39/00* | (2006.01) |
| *F04B 39/04* | (2006.01) |
| *F04B 53/14* | (2006.01) |
| *F16J 1/00* | (2006.01) |
| *F16J 9/12* | (2006.01) |
| *F16J 15/00* | (2006.01) |

(52) U.S. Cl.
      CPC .......... *F04B 39/042* (2013.01); *F04B 53/143*
             (2013.01); *F16J 1/008* (2013.01); *F16J 9/12*
                  (2013.01); *F16J 15/006* (2013.01)

(56)                References Cited

U.S. PATENT DOCUMENTS

| | | | | | |
|---|---|---|---|---|---|
| 3,353,456 | A | * | 11/1967 | Bauer ................. | F04B 39/0016 |
| | | | | | 92/256 |
| 3,386,346 | A | * | 6/1968 | Halpin ....................... | F16J 9/00 |
| | | | | | 92/183 |
| 4,556,223 | A | * | 12/1985 | VanLoon ............... | F16J 15/166 |
| | | | | | 277/584 |
| 5,347,915 | A | | 9/1994 | Feistel | |
| 9,138,839 | B2 | | 9/2015 | Hold | |

OTHER PUBLICATIONS

International Search Report for PCT/EP2023/053264, prepared by the European Patent Office, dated May 8, 2023, 2022, 7 pages including English Translation.
European Office Action for European Application 23703476.4 mailed Aug. 12, 2025. 10 pages.

* cited by examiner

PISTON FOR A COMPRESSOR, COMPRESSOR, AND METHOD AND REMOVAL TOOL FOR DISASSEMBLING A PISTON

CROSS-REFERENCE TO RELATED APPLICATION

This application is the U.S. national phase of PCT Application No. PCT/EP2023/053264 filed on Feb. 10, 2023, which claims priority to EP patent application Ser. No. 22/156,037.8 filed on Feb. 10, 2022, the disclosures of which are incorporated in their entirety by reference herein.

The invention relates to a piston for a compressor, a compressor, in particular a high-pressure compressor with such a piston, as well as a withdrawal tool and a method for disassembling the piston.

STATE OF THE ART

High-pressure reciprocating compressors are often used to compress gases such as methane or hydrogen to a pressure between 100 bar and 1000 bar. Piston compressors typically have a piston guided in a cylinder between a top dead center and a bottom dead center. The piston typically comprises a piston rod and a plurality of piston rings that are attached to an outer circumference of the piston rod. The piston rings can, for example, have carrier rings, wherein sealing elements are attached to the carrier rings. The sealing elements are used to seal a compression chamber defined by the piston and the cylinder and, optionally, to meter a quantity of lubricant between the cylinder and the piston.

The piston rings are wearing parts that need to be replaced after a certain period of time. Depending on the design of the piston, replacing the piston rings may require complete disassembly of the piston and is therefore often time-consuming. Furthermore, space may be tight at the compressor's operational site, which makes replacement even more difficult.

JP 2003 206860 A describes a piston compressor for compressing gas, which has a piston with a piston rod and piston ring devices mounted on it. The piston ring devices each have a carrier ring with an L-shaped cross-section and a sealing element which is fixed to the carrier ring. To make it easier to replace the sealing elements, these are split in the circumferential direction so that they can be removed from the carrier ring without removing the carrier ring from the piston rod.

DESCRIPTION OF THE INVENTION

The problem of the invention is to find solutions which facilitate the replacement of sealing elements of a compressor piston.

This problem is solved by the subject-matter of the independent claims, respectively. Advantageous embodiments and further developments are the subject of the dependent claims referring back to the independent claims, as well as of the following description and the figures.

According to a first aspect of the invention, a piston for a compressor is provided. The piston according to the invention comprises a piston rod, which defines a longitudinal axis, and a piston ring package with a carrier sleeve extending along the longitudinal axis, which is arranged on a circumferential surface of the piston rod and is releasably fastened to the piston rod, and a plurality of piston ring devices arranged next to one another along the longitudinal axis, which are arranged on an outer circumferential surface of the carrier sleeve and are fastened to the carrier sleeve, the carrier sleeve preferably having a mechanical interface for attaching a withdrawal tool for applying a force directed along the longitudinal axis.

According to a second aspect of the invention, a compressor, in particular a high-pressure compressor for compressing gases, such as natural gas, methane or hydrogen, is provided with a piston according to the first aspect of the invention. The compressor can, for example, be set up to compress gas, for example to a pressure in a range between 100 bar and 1000 bar, in particular in a range between 100 bar and 300 bar. For example, the piston can be mounted in a cylinder such that it can move linearly between two dead centers.

According to a third aspect of the invention, there is provided a withdrawal tool for disassembling a piston according to the first aspect of the invention. The withdrawal tool comprises a coupling device for attachment to the preferred mechanical interface of the carrier sleeve and a pulling device for applying a force directed along the longitudinal axis to the coupling device.

According to a fourth aspect of the invention, there is provided a method for disassembling a piston according to the first aspect of the invention. In the method, a withdrawal tool is connected to the preferred mechanical interface of the carrier sleeve of the piston ring package, and the piston ring package as a whole is withdrawn from the piston rod by applying a force directed along the longitudinal axis to the carrier sleeve by means of the withdrawal tool. For example, the withdrawal tool according to the third aspect of the invention can be used to carry out the method.

One idea underlying the invention is to pre-assemble the piston rings, also referred to herein as piston ring devices, on a carrier sleeve to form a piston ring package or cartridge, and to fix this package to the piston rod as a pre-assembled unit. This means that a large number of piston rings are pre-assembled on the outer circumferential surface of the carrier sleeve, and the carrier sleeve is pushed onto an outer circumferential surface of the piston rod or the piston rod is passed through the carrier sleeve. The carrier sleeve preferably also has a mechanical interface or connecting structure to which a withdrawal tool can be fixed in order to apply an axial force to the carrier sleeve to disassemble the piston ring package. This allows the piston rings to be easily withdrawn from the piston rod together with the carrier sleeve.

One advantage of the invention is that the carrier sleeve and piston rings can be withdrawn from the piston rod together as a whole, as the piston rings are attached to the carrier sleeve and not directly to the outer circumference of the piston rod. The preferred mechanical interface further simplifies the withdrawal of the carrier sleeve from the piston rod. This simplifies the disassembly of the piston rings as well as the months of new piston rings and thus the simultaneous replacement of all piston rings.

A further advantage of the pre-assembled piston ring package is that it can be manufactured with high precision, that it can be configured and, if necessary, tested at a production site, and that this reduces the effort required to assemble the piston ring package and to center and fit the piston rings when replacing the piston ring package at the compressor's operational site, e.g. on a transport ship, a drilling platform or the like.

According to some embodiments, it may be provided that the carrier sleeve is frictionally attached to the circumferential surface of the piston rod. Accordingly, an inner circumferential surface of the carrier sleeve can be frictionally connected to the circumferential surface of the piston rod, at least in some areas, or rest against the circumferential surface. This achieves a reliable axial fixation of the carrier sleeve. Optionally, the carrier sleeve can also be axially secured by a securing element screwed to the piston rod.

According to some embodiments, the preferred mechanical interface can be formed by a thread. This offers the advantage of facilitating the connection of the withdrawal tool to the carrier sleeve.

According to an exemplary embodiment, an inner circumferential surface of the carrier sleeve can rest on a first axial section of the circumferential surface of the piston rod in a first end region of the carrier sleeve, and the thread can be formed as an internal thread on the inner circumferential surface at a second end region of the carrier sleeve located opposite the first end region in relation to the longitudinal axis, wherein the inner circumferential surface in the second end region of the carrier sleeve is located at a distance from a second axial section of the circumferential surface of the piston rod in a radial direction perpendicular to the longitudinal axis. The piston rod can thus taper from a first end region of the carrier sleeve towards a second end region of the carrier sleeve, e.g. at a step or a transition cone, so that an annular gap is formed between the internal thread provided in the second end region of the carrier sleeve and the outer circumference of the piston rod, into which the withdrawal tool can be inserted. This makes it even easier to remove the piston ring package. Furthermore, the internal thread offers the advantage that the space required for the preferred mechanical interface is kept to a minimum.

According to some embodiments, it may be provided that the carrier sleeve has a sleeve body and a collar projecting radially from an axial end of the sleeve body, with a piston ring device that is last in relation to the longitudinal axis resting against the collar. In this way, the individual piston rings can be fixed very easily in the axial direction. The axial end at which the collar protrudes in the radial direction can, for example, form the end of the first end region of the carrier body, which optionally rests on the circumferential surface of the piston rod. In other words, the collar is preferably arranged opposite to the preferred mechanical interface, which in turn is advantageously also arranged in an end region of the carrier sleeve.

Optionally, the collar can rest against a shoulder of the piston rod. This is a simple way of axially securing the piston ring package to the piston rod.

According to some embodiments, the piston ring devices can be connected to each other along the longitudinal axis. Accordingly, piston ring devices are advantageously fixed to the carrier sleeve in the axial direction.

According to an exemplary embodiment, it may be provided that the piston ring package has a first end piece and a second end piece, with the piston ring devices being clamped between the first and second end pieces. This provides a simple way of fixing all piston rings relative to each other in the axial direction.

According to some embodiments, each of the piston ring devices clamped between the first and second end pieces may have a through hole, and a threaded rod connecting the first and second end pieces may extend through the through holes. For example, the threaded rod may be screwed to a thread provided on the second end piece, and the first end piece may be secured to the threaded rod via a nut. The threaded rod offers the advantage that the clamping forces can be precisely adjusted in the axial direction. Furthermore, centering of the piston rings can be simplified in this way.

Optionally, the first end piece can be formed by a ring element and the second end piece by another piston ring device. This advantageously reduces the number of components in the piston ring package, as the second end piece performs both the function of a piston ring and the function of fixing the other piston rings.

According to some embodiments, it may be provided that the piston ring devices each have a carrier ring surrounding the outer circumferential surface of the carrier sleeve and a sealing element which is attached to the carrier ring.

According to some embodiments of the withdrawal tool, it may be provided that the coupling device has a sleeve, in which an end region of the piston rod can be accommodated and which can be coupled to the preferred mechanical interface of the carrier sleeve, and an end plate connected to the sleeve, which has a through hole with an internal thread, wherein the withdrawal device has a threaded rod which can be screwed into the internal thread of the end plate in order to be supported against an axial end of the piston rod. The sleeve of the withdrawal tool can, for example, have an external thread which can be screwed to a mechanical interface of the carrier sleeve designed as an internal thread. To remove the carrier sleeve, for example in the process described above, the threaded rod of the withdrawal tool is screwed into the internal thread of the end plate of the sleeve and thus presses against the axial end of the piston rod. The reaction force directed away from the piston rod along the longitudinal axis is transferred to the sleeve via the internal thread of the end plate and from this to the carrier sleeve, so that the carrier sleeve can be easily pulled off the piston rod.

The features and advantages disclosed for one aspect of the invention are also disclosed for the respective other aspects.

BRIEF DESCRIPTION OF THE DRAWINGS

The drawings used to illustrate the embodiments show.

Generally, identical parts are marked with identical reference symbols in the drawings, unless otherwise indicated.

WAYS TO CARRY OUT THE INVENTION

Figure 1:
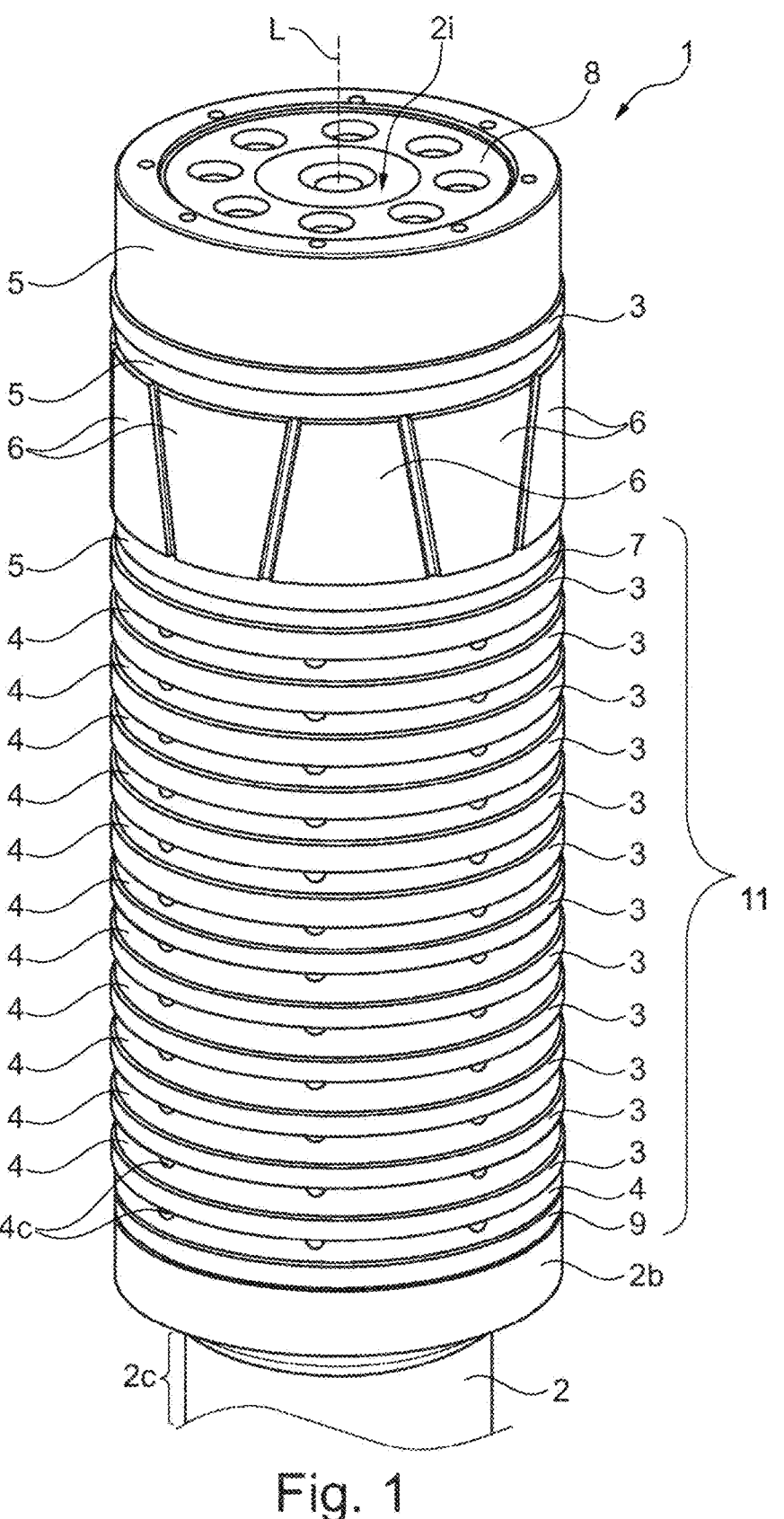
FIG. 1 a perspective view of a piston according to an embodiment of the invention.

FIG. 1 shows an exemplary perspective view of a piston 1 for a compressor (not shown). In particular, the compressor can be a high-pressure piston compressor which is set up to compress gases, such as natural gas, methane, hydrogen, etc., in particular to a pressure in a range between 100 bar and 500 bar. For example, the compressor can be used on a transport ship or a drilling platform, e.g. to compress gas that accumulates in a storage tank due to vaporization from the liquid phase and feed it to an internal combustion engine. Piston 1, which is described in detail below, can be moved in a horizontal or vertical arrangement by a crankshaft alternately between two opposing dead centers. The piston 1 can be guided in a cylinder (not shown). Optionally, the piston 1 can be designed as a double-acting piston and perform compression work both when moving in a first direction and when moving in the opposite direction.

As illustratively shown in FIG. 1, the piston 1 can have a piston rod 2 and a piston ring package 11. Furthermore, the piston 1 can have a piston top section 5 and/or an axial lock 8.

Figure 2:
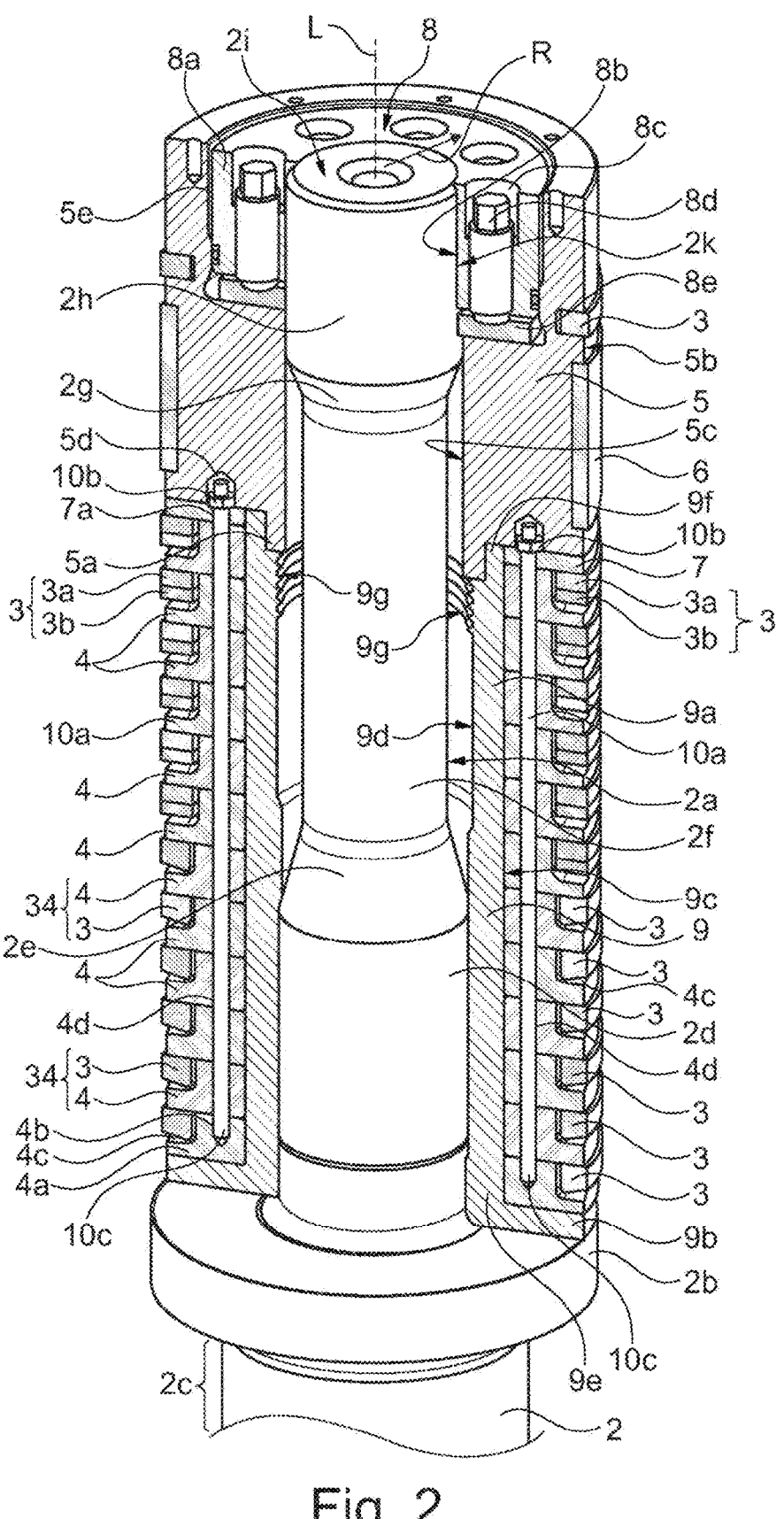
FIG. 2 a sectional view of the piston shown in FIG. 1.

FIG. 2 shows a partial sectional view of the piston 1 shown in FIG. 1. As shown in FIGS. 1 and 2, the piston rod 2 can, for example, be realized as a shaft with a circular cross-section. In general, the piston rod 2 defines a longitudinal axis L, which is enclosed by a circumferential surface 2a of the piston rod 2. As shown in FIG. 2, the piston rod 2 can have a first axial section 2d designed as a centering section with a first diameter and an expansion section 2f located at a distance from this along the longitudinal axis L with a second diameter that is smaller than the first diameter. As illustratively shown in FIG. 2, the first axial section 2d and the expansion section 2f can be connected to one another by a first conical section 2e. An end section 2h of the piston rod 2, which ends at an end face 2i of the piston rod 2, has a third diameter. The third diameter can, as illustratively shown in FIG. 2, be essentially the same as the first diameter. In this case, the expansion section 2f can, for example, be connected to the end section 2h by a second conical section 2g, as shown as an example in FIG. 2, or by a shoulder. However, it is also conceivable that the third diameter is equal to the second diameter or generally smaller than the first diameter.

Optionally, the end section 2h of the piston rod 2 can have an external thread 2k, as also illustratively shown in FIG. 2. Also optionally, the piston rod 2 can have a shoulder 2b, designed as a piston crown, which is arranged at a distance from the end face 2i of the piston rod 2 and projects in a radial direction R running perpendicular to the longitudinal axis L. For example, the shoulder 2b can be arranged directly adjacent to the first axial section 2d in relation to the longitudinal axis L, in particular in such a way that the first axial section 2d is located between the end face 2i and the shoulder 2b, as illustratively shown in FIG. 2.

In particular, the piston rod 2 can be made of a metal material, such as a high-strength structural steel.

As shown in FIG. 1 and with more details in FIG. 2, the piston ring package 11 can comprise a carrier sleeve 9 and a plurality of piston ring devices 34, each comprising a piston ring 3 and a chamber ring 4. Optionally, the piston ring package 11 can also comprise a first end piece 7, for example designed as the last chamber ring, and a second end piece 4a, for example designed as a cover ring, as shown as an example in FIG. 2. Also optionally, the piston ring package 11 further comprises one or more threaded rods 10a, as illustratively shown in FIG. 2, which hold together the piston ring devices 34 comprising piston rings 3 and chamber rings 4, the first end piece 7 and the second end piece 4a. As shown in FIG. 2, in possible embodiments a piston ring 3 can consist of a single part or of a plurality of partial rings 3a, 3b. FIG. 2 shows piston ring devices 34 arranged towards the first end region 9e of the carrier sleeve 9 comprising a chamber ring 4 and in each case a single piston ring 3, whereas the piston ring devices 34 arranged towards the second end region 9f comprise a chamber ring 4 and in each case a piston ring 3 consisting of a first piston ring part 3a and a second piston ring part 3b. In a further embodiment, not shown, all piston rings 3 could also consist of a single part, or all piston rings 3 could consist of at least two piston ring parts, a first piston ring part 3a and a second piston ring part 3b.

The carrier sleeve 9 serves as a holder or carrier for the piston ring devices 34. As illustratively shown in FIG. 2, the carrier sleeve 9 can have a cylindrical sleeve body 9a. In general, the carrier sleeve 9 is realized as an elongated, sleeve-shaped part that extends between a first end region 9e and an oppositely located second end region 9f. The carrier sleeve 9, in particular the sleeve body 9a, has an inner circumferential surface 9d and an oppositely oriented outer circumferential surface 9c. The outer circumferential surface 9c can, for example, form the lateral surface of a circular cylinder. The inner circumferential surface 9d can also form cylindrical areas. Furthermore, the inner circumferential surface 9d can, for example, have or form steps, which in each case delimit cylindrical areas in relation to the longitudinal axis L, as illustratively shown in FIG. 2.

Optionally, the carrier sleeve 9 can have a collar 9b at one axial end, e.g. at the end of the sleeve body 9a, e.g. at the end to which the first end region 9e is connected. As illustratively shown in FIG. 2, the collar 9b protrudes vertically from the outer circumferential surface 9c of the sleeve body 9a, and thus extends in the radial direction R.

Figure 4:
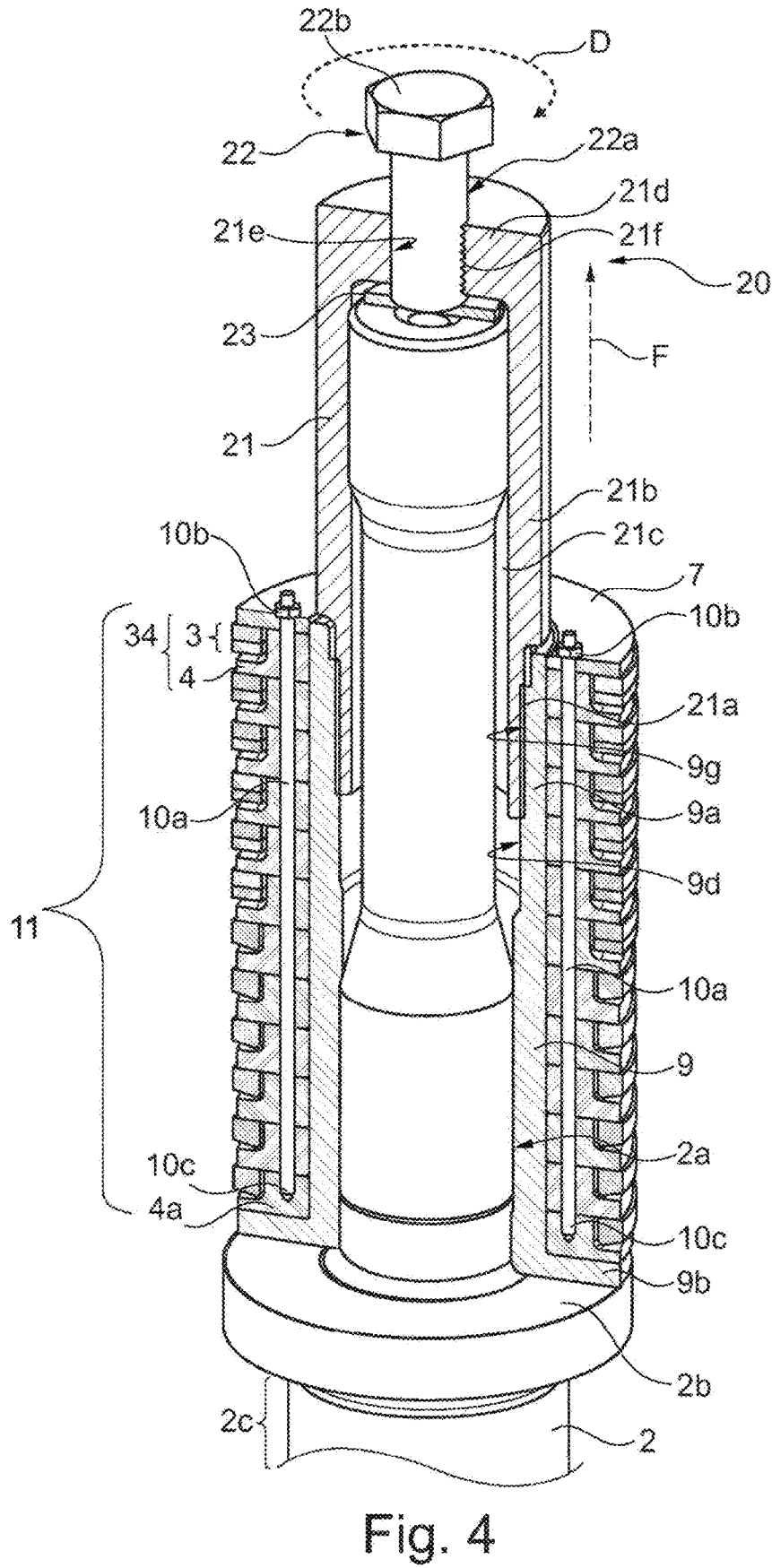
FIG. 4 the sectional view from FIG. 2 during disassembly of the piston by a method according to an embodiment of the invention, which is carried out with the aid of a withdrawal tool according to an embodiment of the invention.

In this preferred embodiment, the carrier sleeve 9 also has a mechanical interface 9g, which is designed for connecting or attaching a withdrawal tool 20 (FIG. 4). The mechanical interface 9g can be realized, for example, as shown in FIGS. 2 and 4, by a thread that is formed on the carrier sleeve 9, e.g. at the end of the sleeve body 9a. FIG. 2 shows as an example that the mechanical interface is realized as an internal thread 9g, which is formed on the inner circumferential surface 9d of the carrier sleeve 9. As illustratively shown in FIG. 2, the mechanical interface 9g can be arranged in the second end area 9f of the carrier sleeve 9, regardless of its specific design. In the example shown in FIG. 2, the internal thread 9g is therefore formed in the second end region 9f of the sleeve body 9a, which faces away from the optional collar 9b. Instead of a thread, the mechanical interface 9g can also be designed differently in order to create a connection between the carrier sleeve 9 and the withdrawal tool 20 that enables the carrier sleeve 9 to be pulled off, e.g. by means of a mechanical interface 9g with slots running at right angles in the carrier sleeve 9, which form part of a bayonet lock with the withdrawal tool 20, for example.

As shown in FIG. 2, the piston ring devices 34 preferably each comprise a chamber ring 4 and a piston ring 3. The chamber rings 4 can, for example, have an L-shaped cross-section, as illustratively shown in FIG. 2. The piston rings 3 are held on the chamber ring 4, in particular on its outer circumference. As shown in FIG. 2, the piston rings 3 can, for example, be held in a receiving space of the chamber ring 4, which is formed by the L-shaped cross-section. In general, the piston rings 3 protrude beyond the outer circumference of the chamber rings 4. FIG. 2 shows, by way of example, that a first subset of the piston rings 3 are designed as sealing elements with a rectangular cross-section and a second subset of the piston rings 3 are designed as sealing elements with a trapezoidal cross-section. However, it is also conceivable that all piston rings 3 are of the same design. Furthermore, other cross-sectional shapes of the piston rings 3 are also conceivable and/or that all piston rings 3 have the same cross-section. It is also possible that several partial piston rings 3a, 3b of a piston ring 3 are held on a chamber ring 4. As shown in FIG. 1, the piston ring devices 34, in particular the chamber rings 4, can each have at least one through hole 4c. Several through holes 4c can be provided along a circumferential direction for each piston ring device 34, e.g. two, three or four. FIG. 2 shows a purely exemplary sectional view in which two through holes 4c per piston ring arrangement 34 are visible.

As illustratively shown in FIG. 2, the piston ring devices 34 are arranged on the outer circumferential surface 9c of the carrier sleeve 9. In particular, the carrier sleeve 9 passes through a central ring opening of all chamber rings 4. The piston ring devices 34 or the chamber rings 4 are arranged next to each other or on top of each other so that the chamber rings 4 abut against each other. Optionally, a last chamber ring 4a in relation to the longitudinal axis L rests against the optional collar 9b of the carrier sleeve 9, as illustratively shown in FIG. 2. As also shown in FIG. 2, the piston ring devices 34 can be aligned in such a way that the through openings of the chamber rings 4 are aligned. The piston ring devices 34, in particular the chamber rings 4, can for example be frictionally connected to the outer circumferential surface 9c of the carrier sleeve 9, e.g. by the central ring opening of the chamber rings 4 and the outer circumferential surface 9c of the carrier sleeve 9 forming an interference fit.

As illustratively shown in FIG. 2, the piston ring devices 34 can be clamped between the optional first end piece 7 and the optional second end piece 4a. As shown in FIG. 2, the first end piece 7 can be arranged in particular in the second end region 9f of the carrier sleeve 9, and the second end piece 4a can be arranged in the first end region 9e of the carrier sleeve 9, e.g. resting against the optional collar 9b of the carrier sleeve 9. The first end piece 7 can be formed, for example, by a cover ring which encloses the outer circumferential surface 9c of the carrier sleeve 9. The second end piece 4a can, for example, be formed by a last or outermost chamber 4, as shown as an example in FIG. 2. However, it is also conceivable that the second end piece 4a is formed by the optional collar 9b of the carrier sleeve 9 or by a ring element, as described for the first end piece 7.

As illustratively shown in FIG. 2, the second end piece 4a can have a recess 4b with an internal thread. Several recesses 4b per end piece 4a are also conceivable, with the recess(es) 4b being arranged in alignment with the through holes 4d of the chamber rings 4. For its part, the first end piece 7 can have one or more recesses 7a, which are arranged in alignment with the through holes 4d of the chamber rings 4. As illustratively shown in FIG. 2, a threaded rod 10a can be provided, which extends through the recesses 7a of the first end piece 7 and the through holes 4d of the chamber rings 4 and is screwed into the internal thread of the respective recess 4b of the second end piece 4a. To axially secure the chamber rings 4 along the threaded rod 10a or to generate a clamping force between the first and second end pieces 7, 4a, a nut 10b can be screwed onto an end of the threaded rod 10a that protrudes beyond the first end piece 7, as illustratively shown in FIG. 2. In general, each piston ring device 34 can thus have a through hole 4d and a threaded rod 10a extending through it, which connects the first and second end pieces 7, 4a to one another. In this way, all piston ring devices 34 can be connected to one another along the longitudinal axis L.

The piston ring package 11 is arranged on the circumferential surface 2a of the piston rod 2. As illustratively shown in FIG. 2, the piston rod 2 can be passed through the recess defined by the inner circumferential surface 9d of the carrier sleeve 9. The piston ring package 11 is thus arranged on the piston rod 2 in such a way that the carrier sleeve 9 extends along the longitudinal axis L. The inner circumferential surface 9d faces the circumferential surface 2a of the piston rod 2. Optionally, for example, it can be provided that the carrier sleeve 9 is frictionally attached to the circumferential surface 2a of the piston rod 2. For example, the inner circumferential surface 9d of the carrier sleeve 9 in the first end region 9e of the carrier sleeve 9 can bear against the first axial 2d section of the circumferential surface 2a on the piston rod 2, as illustratively shown in FIG. 2. In general, the inner circumferential surface 9d of the carrier sleeve 9 can at least partially abut the circumferential surface 2a of the piston rod 2. In general, the carrier sleeve 9 is thus releasably attached to the piston rod 2. As can also be seen in FIG. 2, the inner circumferential surface 9d in the second end region 9f of the carrier sleeve 9 can be located in the radial direction R at a distance from the second axial section 22 of the circumferential surface 2a of the piston rod 2. This allows an annular gap to be formed in the second end region 9f of the carrier sleeve 9 between the inner circumferential surface 9d of the carrier sleeve 9 and the circumferential surface 2a of the piston rod 2. This facilitates the accessibility of the mechanical interface 9g, for example in the form of an internal thread.

As further shown in FIG. 2, it can be provided that the optional collar 9b of the carrier sleeve 9 rests against the shoulder 2b of the piston rod 2. The second end region 9f of the carrier sleeve 9, in which the mechanical interface 9g is preferably arranged, can, for example, be located facing the expansion section 2f of the piston rod 2.

The guide ring 6 of the piston 1 is used for contact with an inner surface of a cylinder of the compressor (not shown). As shown in FIGS. 1 and 2, the piston 1 comprises an upper piston part 5, on which the guide ring 6 and an optional piston ring 3 are arranged. The upper piston part 5 has a cylindrical outer circumferential surface 5b and an inner circumferential surface 5c which is oriented in the opposite direction thereto. Recesses can be provided on the outer circumferential surface 5b, in which guide elements or a guide ring 6 are arranged. As can be seen in FIG. 1, the guide ring 6 can have a trapezoidal circumference, for example. The inner circumferential surface 5c defines a central passage extending in the longitudinal direction L between two opposing end faces of the upper part of the piston 5. As illustratively shown in FIG. 2, a centering collar 5a can be formed on a first end face, which surrounds the passage. A recess 5e, which laterally surrounds the passageway, can be formed on an opposite second end face, as illustratively shown in FIG. 2.

The piston rod 2 can be passed through the passage of the piston top section 5 defined by the inner circumferential surface 5c, as shown in FIG. 2. The centering collar 5a can optionally be inserted into the carrier sleeve 9 and lie against the inner circumferential surface 9d of the carrier sleeve 9. Advantageously, the first end face of the piston top section 5 can rest against the piston ring package 11, e.g. against the carrier sleeve 9 and/or the first end piece 7, as shown in FIG. 2. An end of the optional threaded rod 10a projecting from the piston ring package 11 and the nut 10b, if provided, can be accommodated in corresponding recesses 5d of the first end face of the piston top section 5.

The optional axial lock 8 can, for example, have a ring 8a with an internal thread 8b and several through holes 8c. The ring 8a can be screwed with its internal thread 8b to an optional piston rod thread 2h, which can be provided in the end region of the piston rod 2. The ring 8a can also be clamped to the piston top section 5 via fastening means 8a arranged in the through holes 8c, and advantageously via a spacer washer 8e, thereby securing it. In this way, an axial force is applied to the carrier sleeve 9 via the piston top section 5 by the axial lock 8 or the piston ring package 11 is clamped between the axial lock 8 and the collar 2b. In principle, it is also conceivable that the axial lock 8 presses directly onto one end of the carrier sleeve 9.

As illustratively shown in FIG. 2, the ring 8a can be arranged in the recess 5e of the upper part of the piston 5. Optionally, a spacer disk 8e can be arranged between the base of the recess 5e and the ring 8a in relation to the longitudinal axis L, as illustratively shown in FIG. 2. Furthermore, the through holes 8c of the ring 8a can be provided with internal threads into which screws 8d are screwed so that they press against the spacer disk 8e or directly against the base of the recess 5e.

Figure 3:
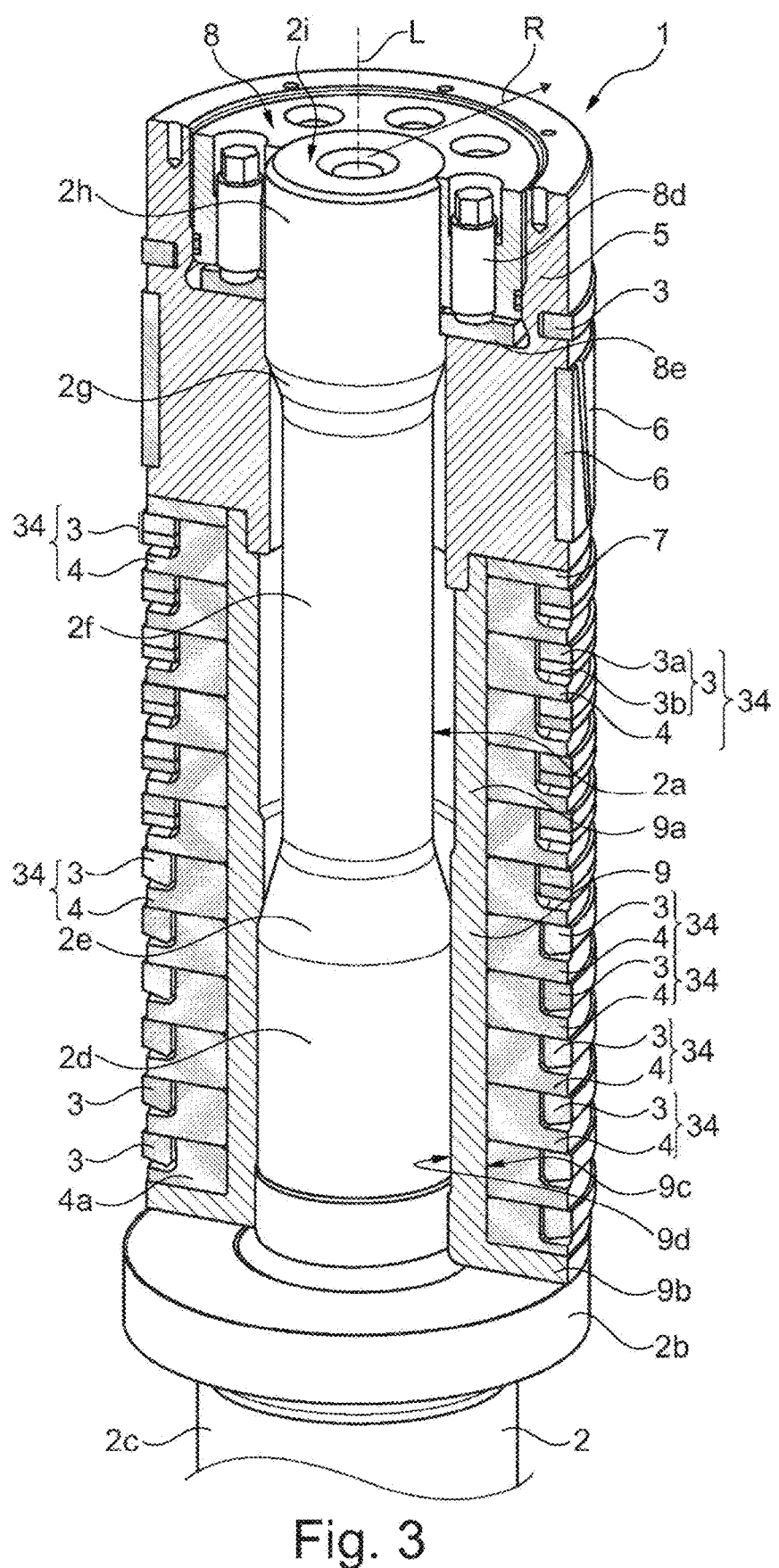
FIG. 3 a sectional view of a piston according to a further embodiment.

FIG. 3 illustratively shows another piston 1 in a sectional view. The piston 1 shown in FIG. 3 differs from the piston shown in FIGS. 1 and 2 in that the piston ring devices 34 are not connected to each other by a threaded rod 10a, but are clamped between the first and second end pieces 7, 4a by a force exerted by the piston top section 5 and the axial lock 8. In particular, the first end face of the upper piston part 5 is in contact with the second end piece 4a, so that the piston ring devices 34 are clamped between the upper piston part 5 and the collar 9b of the carrier sleeve 9. In this way, the piston ring devices 34 can be connected to each other along the longitudinal axis L or held securely against each other.

FIG. 4 shows an example of a withdrawal tool 20 for removing the piston 1. As illustratively shown in FIG. 4, the withdrawal tool 20 can have a coupling device 21 for attachment to the preferred mechanical interface 9g of the carrier sleeve 9 and a pulling device 22 for applying a force F directed along the longitudinal axis L to the coupling device 21.

The coupling device 21 can, for example, have a sleeve 21b and an end plate 21d. As illustratively shown in FIG. 4, the sleeve 21b can define an open receiving space 21c, which can be cylindrical, for example. A connecting structure 21a, e.g. in the form of a thread, can be formed at a first end section of the sleeve 21b, which is designed for connection to the preferred mechanical interface 9g of the carrier sleeve 9 of the piston ring pack 11. FIG. 4 shows by way of example that the connecting structure 21a can, for example, be designed as an external thread.

The end plate 21d is connected to the sleeve 21b. For example, the sleeve 21b and the end plate 21d can be formed in one piece or as one part. In particular, the end plate 21d can be arranged on a second end section of the sleeve 21b opposite the first end section, as illustratively shown in FIG. 4. The end plate 21d can, for example, have a through hole 21e with an internal thread, as shown in FIG. 4.

As in FIG. 4, the pulling device 22 can be realized particularly simply by a threaded rod 22a, which can be screwed into the internal thread 21e of the end plate 21d. This allows the threaded rod 22a to be inserted through the through hole 21e of the end plate 21d into the receiving space 21c. In general, the pulling device 22 can be inserted into the receiving space 21c from an axial end of the sleeve 21b and can be supported relative to the sleeve 21b in order to exert an axial force.

A simple procedure for disassembling the piston 1 can be carried out using the described withdrawal tool 20. However, the procedure described below can also be carried out with differently designed withdrawal tools 20.

If required, the axial lock 8 and, if necessary, the upper part of the piston 5 are first removed from the piston rod 2. The piston 1 is then in the assembled state shown in FIG. 4.

In order to remove the piston ring package 11, which is releasably connected to the piston rod 2, for example because the carrier sleeve 9 is in frictional contact with the circumferential surface 2a of the piston rod 2, from the piston rod 2, the withdrawal tool 20 is connected to the preferred mechanical interface 9g of the carrier sleeve 9 of the piston ring package 11. For example, the end face 2i of the piston rod 2 is inserted into the receiving space 21c of the sleeve 21b of the coupling device 21 and the connecting structure 21a of the sleeve 21b is connected to the preferred mechanical interface 9g of the carrier sleeve 9. For example, the connecting structure 21a of the sleeve 21b, which is designed as an external thread, can be screwed to the mechanical interface 9g of the carrier sleeve 9, which is designed as an internal thread, as shown in FIG. 4.

In a further step, the piston ring package 11 is removed as a whole from the piston rod 2 by applying a force F directed along the longitudinal axis L to the carrier sleeve 9 by means of the withdrawal tool 20, in particular by means of the pulling device 22. The pulling device 22 can, for example, be supported on the end face 2i of the piston rod 2 and exert a force F directed away from the piston rod 2 on the coupling device 21 in order to remove the piston ring package 11 from the piston rod 2. As illustratively shown in FIG. 4, the threaded rod 22a, for example, can be screwed into the internal thread 21e of the end plate 21d so that it is supported against the axial end, the end set 2i of the piston rod 2, located in the receiving space 21c. Optionally, a washer 23 can be arranged between the axial end and the threaded rod 22a in order to prevent damage to the piston rod 2 by the threaded rod 22a. As indicated by the arrow "F" in FIG. 4, a reaction force is thus exerted on the sleeve 21b, which is transmitted to the carrier sleeve 9 via the mechanical interface 9g so that it is pulled off the piston rod 2 along the longitudinal axis L.

This allows the piston ring package 11 to be detached from the piston rod 2 as a whole. In particular, all piston ring assemblies 34 are removed at the same time. This allows the piston 1 to be removed easily and efficiently. In the same way, a pre-assembled piston ring package 11 can be mounted as a whole on the piston rod 2. This enables the piston ring devices 34 to be replaced or the chamber rings 4 and piston rings 3 to be fitted extremely quickly, efficiently and safely. Another significant advantage is that the piston ring package 11 is advantageously assembled at the factory, so that all the necessary testing and safety specifications can already be carried out at the factory. It is also ensured that hardly any assembly errors occur when assembling the piston ring package 11 on site, for example on a ship, as the chamber rings 4 and piston rings 3 are delivered pre-assembled in the piston ring package 11.

The invention claimed is:

1. A piston for a compressor, comprising:
a piston rod defining a longitudinal axis (L); and
a piston ring package with a carrier sleeve extending along the longitudinal axis (L), which is arranged on a circumferential surface of the piston rod and is releasably fastened to the piston rod, and a plurality of piston ring devices which are arranged next to one another along the longitudinal axis (L), which are arranged on an outer circumferential surface of the carrier sleeve and are fastened to the carrier sleeve; and
wherein the piston ring devices are connected to each other along the longitudinal axis (L);
the piston ring package has a first end piece and a second end piece, and the piston ring devices are clamped between the first and second end piece; and
each of the piston ring devices clamped between the first and second end piece has a through hole, and a threaded rod, which connects the first and second end piece to each other, extends through the through holes.

2. The piston according to claim 1, wherein the carrier sleeve has a mechanical interface for attaching a withdrawal tool for applying a force (F) directed along the longitudinal axis (L).

3. The piston according to claim 2, wherein the mechanical interface is formed by a thread.

4. The piston according to claim 2, wherein an inner circumferential surface of the carrier sleeve in a first end region of the carrier sleeve rests against a first axial section of the circumferential surface of the piston rod, wherein the mechanical interface is formed as an internal thread on the inner circumferential surface at a second end region of the carrier sleeve located opposite to the first end region with respect to the longitudinal axis (L), and wherein the inner circumferential surface in the second end region of the carrier sleeve is located in a radial direction (R) perpendicular to the longitudinal axis (L) at a distance from an expansion section of the circumferential surface of the piston rod.

5. The piston according to claim 1, wherein the carrier sleeve is frictionally secured to the circumferential surface of the piston rod.

6. The piston according to claim 1, wherein the carrier sleeve has a sleeve body and a collar projecting radially from an axial end of the sleeve body, and wherein a piston ring device which is last in relation to the longitudinal axis (L) rests against the collar.

7. The piston according to claim 6, wherein the collar rests against a shoulder of the piston rod.

8. The piston according to claim 1, wherein the first end piece is formed by a piston ring device and the second end piece is formed by a further piston ring device.

9. The piston according to claim 1, wherein the piston ring devices each have a chamber ring surrounding the outer circumferential surface of the carrier sleeve and a piston ring which is fastened to the chamber ring.

10. A compressor with a piston according to claim 1.

11. A withdrawal tool for disassembling a piston according to claim 1, comprising:

a coupling device for attachment to a mechanical interface of a carrier sleeve, wherein the coupling device has a coupling device sleeve, in which an end region of a piston rod can be accommodated, and which can be coupled to a mechanical interface of the carrier sleeve, and an end plate connected to the coupling device sleeve, which has a through hole with an internal thread; and a pulling device for applying a force (F) directed along a longitudinal axis (L) to the coupling device, wherein the pulling device has a threaded rod which can be screwed into the internal thread of the end plate to be supported against an end face of the piston rod.

12. A method of disassembling a piston according to claim 1, comprising:

connecting a pulling tool to a mechanical interface of a carrier sleeve of a piston ring package; and removal of the piston ring package as a whole from a piston rod by applying a force directed along a longitudinal axis (L) to the carrier sleeve by means of a withdrawal tool.

* * * * *